US011948185B2

(12) United States Patent
Smith et al.

(10) Patent No.: US 11,948,185 B2
(45) Date of Patent: Apr. 2, 2024

(54) AUTOMATICALLY MERGING PICKUP AND DELIVERY TIME SLOTS FROM NEARBY STORES

(71) Applicant: Walmart Apollo, LLC, Bentonville, AR (US)

(72) Inventors: Austin Lee Smith, San Jose, CA (US); Vineet Wason, San Jose, CA (US); Mihir Vijay Bendale, Pleasanton, CA (US); Vidyanand Krishnan, Sunnyvale, CA (US); Navkaran Singh Chadha, San Francisco, CA (US); Puneet Srivastava, Fremont, CA (US); Yiren Ye, Milpitas, CA (US); Nitish Sarin, Gurgaon (IN); Avaneesh Tiwari, Kanpur (IN); Zekariyas Kassa Gebru, Sunnyvale, CA (US); Rohit Jain, Sunnyvale, CA (US); Surnaik Srivastava, Santa Clara, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 65 days.

(21) Appl. No.: 17/486,663

(22) Filed: Sep. 27, 2021

(65) Prior Publication Data
US 2022/0101414 A1 Mar. 31, 2022

Related U.S. Application Data

(60) Provisional application No. 63/083,433, filed on Sep. 25, 2020.

(51) Int. Cl.
*G06Q 30/0601* (2023.01)
*G06Q 10/0631* (2023.01)
(Continued)

(52) U.S. Cl.
CPC ... *G06Q 30/0639* (2013.01); *G06Q 10/06312* (2013.01); *G06Q 10/06315* (2013.01);
(Continued)

(58) Field of Classification Search
None
See application file for complete search history.

(56) References Cited

U.S. PATENT DOCUMENTS 6,990,460 B2 1/2006 Parkinson
7,177,825 B1 * 2/2007 Borders ............... G06Q 30/016
705/28

(Continued)

FOREIGN PATENT DOCUMENTS

WO WO-2011054712 A1 * 5/2011 ............ G06Q 10/06

OTHER PUBLICATIONS

Jochen et al. "Integrating Customer Choice in Differentiated Slotting for Last-Mile Logistics", Feb. 2018, Logistics Research, pp. 1-23 (Year: 2018).*

*Primary Examiner* — Romain Jeanty
(74) *Attorney, Agent, or Firm* — BRYAN CAVE LEIGHTON PAISNER LLP

(57) ABSTRACT

A method being implemented via execution of computing instructions configured to run at one or more processors. The method can include determining a primary store and one or more secondary stores for pickup of an order of a user, based at least in part on a pickup type of the order. The method also can include determining real-time availabilities of first time slots at the primary store and real-time availabilities of second time slots at the one or more secondary stores. The method additionally can include generating a list of available time slots comprising at least a portion of the first time slots at the primary store and at least a portion of the second time slots at the one or more secondary stores, based at least
(Continued)

in part on the real-time availabilities of the first time slots at the primary store and the real-time availabilities of the second time slots at the one or more secondary stores. The method further can include facilitating displaying to the user a user interface comprising at least a portion of the list of available time slots. Other embodiments are described.

20 Claims, 10 Drawing Sheets

(51) Int. Cl.
    *G06Q 10/0836*     (2023.01)
    *G06Q 10/087*     (2023.01)

(52) U.S. Cl.
    CPC ....... *G06Q 10/0836* (2013.01); *G06Q 10/087* (2013.01); *G06Q 30/0633* (2013.01)

(56) References Cited

U.S. PATENT DOCUMENTS

| | | | |
|---|---|---|---|
| 7,251,612 | B1 | 7/2007 | Parker et al. |
| 7,257,552 | B1* | 8/2007 | Franco .................. G06Q 10/08 |
| | | | 705/28 |
| 9,185,674 | B2* | 11/2015 | Sauer ...................... H04W 4/40 |
| 10,417,690 | B2 | 9/2019 | Mueller et al. |
| 10,700,798 | B1* | 6/2020 | Elnajjar ................. H04H 60/06 |
| 2002/0147654 | A1 | 10/2002 | Kraisser et al. |
| 2002/0152128 | A1* | 10/2002 | Walch ............... G06Q 30/0633 |
| | | | 705/26.8 |
| 2004/0107110 | A1* | 6/2004 | Gottlieb ............ G06Q 30/0283 |
| | | | 705/400 |
| 2014/0095350 | A1 | 4/2014 | Carr et al. |
| 2014/0279294 | A1* | 9/2014 | Field-Darragh ... G06Q 30/0282 |
| | | | 705/28 |
| 2014/0330738 | A1 | 11/2014 | Falcone et al. |
| 2018/0053149 | A1* | 2/2018 | Sarrapy ............. G06Q 10/0834 |
| 2020/0410441 | A1* | 12/2020 | Bourland ............ G06F 16/9558 |

* cited by examiner

400

| 410 – Determining a primary store and one or more secondary stores for pickup of an order of a user |

↓

| 420 – Determining real-time availabilities of first time slots at the primary store and real-time availabilities of second time slots at the one or more secondary stores |

↓

| 430 – Generating a list of available time slots |

↓

| 440 – Facilitating displaying to the user a user interface comprising at least a portion of the list of available time slots |

↓

| 450 – Receiving a selection of a time slot from the user |

↓

| 460 – Determining whether all items in the order are available at a secondary store |

↓

| 470 – Facilitating displaying to the user one or more items that are not available at the secondary store |

↓

| 480 – Receiving, from the user, a completion indication for the order |

| 510 – Receiving, from the user, the pickup type for the order |

↓

| 520 – Determining the primary store based at least in part on the pickup type |

↓

| 530 – Determining the one or more secondary stores based at least in part on the pickup type |

| Slot | Sun | Mon | Tue | Wed | Thur | Fri | Sat | Grand Total |
|---|---|---|---|---|---|---|---|---|
| 700 | 100% | 100% | 58% | 44% | 60% | 46% | 100% | 73% |
| 800 | 100% | 92% | 100% | 69% | 75% | 100% | 100% | 91% |
| 900 | 100% | 100% | 79% | 85% | 33% | 100% | 100% | 85% |
| 1000 | 100% | 83% | 67% | 46% | 54% | 100% | 100% | 79% |
| 1100 | 100% | 83% | 100% | 90% | 85% | 83% | 100% | 92% |
| 1200 | 93% | 100% | 73% | 83% | 79% | 100% | 100% | 90% |
| 1300 | 100% | 85% | 58% | 69% | 83% | 85% | 100% | 83% |
| 1400 | 100% | 100% | 79% | 60% | 100% | 100% | 100% | 91% |
| 1500 | 100% | 100% | 93% | 75% | 93% | 100% | 100% | 94% |
| 1600 | 100% | 100% | 100% | 88% | 100% | 100% | 100% | 98% |
| 1700 | 100% | 100% | 73% | 92% | 85% | 100% | 100% | 93% |
| 1800 | 100% | 100% | 78% | 90% | 100% | 100% | 100% | 95% |
| 1900 | 100% | 100% | 33% | 71% | 63% | 71% | 67% | 72% |
| Grand Total | 99% | 96% | 76% | 74% | 78% | 90% | 97% | 87% |

FIG. 7

| Slot | Sun | Mon | Tue | Wed | Thur | Fri | Sat | Grand Total |
|---|---|---|---|---|---|---|---|---|
| 700 | 71% | 38% | 45% | 44% | 44% | 20% | 75% | 48% |
| 800 | 100% | 29% | 38% | 70% | 30% | 71% | 72% | 59% |
| 900 | 100% | 29% | 64% | 67% | 36% | 67% | 77% | 63% |
| 1000 | 100% | 64% | 44% | 70% | 62% | 63% | 95% | 71% |
| 1100 | 100% | 83% | 13% | 67% | 19% | 25% | 94% | 57% |
| 1200 | 94% | 45% | 58% | 27% | 75% | 73% | 64% | 63% |
| 1300 | 100% | 45% | 45% | 43% | 53% | 77% | 86% | 64% |
| 1400 | 100% | 53% | 93% | 75% | 85% | 65% | 88% | 80% |
| 1500 | 94% | 68% | 71% | 74% | 56% | 85% | 83% | 76% |
| 1600 | 85% | 59% | 42% | 75% | 65% | 95% | 83% | 72% |
| 1700 | 92% | 95% | 75% | 59% | 84% | 91% | 100% | 85% |
| 1800 | 82% | 85% | 79% | 43% | 44% | 83% | 92% | 73% |
| 1900 | 90% | 60% | 67% | 42% | 13% | 78% | 73% | 60% |
| Grand Total | 93% | 58% | 57% | 58% | 51% | 69% | 83% | 67% |

AUTOMATICALLY MERGING PICKUP AND DELIVERY TIME SLOTS FROM NEARBY STORES

CROSS-REFERENCE TO RELATED APPLICATION

This application claims the benefit of U.S. Provisional Application No. 63/083,433, filed Sep. 25, 2020. U.S. Provisional Application No. 63/083,433 is incorporated herein by reference in its entirety.

TECHNICAL FIELD

This disclosure relates generally to automatically merging pickup and delivery time slots from nearby stores.

BACKGROUND

Some retailers offer users the option to order items online and pick up the items at a physical retail location. For example, some retailers offer online grocery ordering, in which users order groceries online and pick up the grocery order at a grocery store of the retailer. Some retailers have multiple store locations. When a user chooses to pick up an online order, the user typically designates a time to pick up the order from a particular store location.

BRIEF DESCRIPTION OF THE DRAWINGS

To facilitate further description of the embodiments, the following drawings are provided in which:

FIG. 4 illustrates a flow chart for a method, according to an embodiment;

FIG. 5 illustrates a flow chart for the activity of FIG. 4 of determining a primary store and one or more secondary stores for pickup of an order of a user, based at least in part on a pickup type of the order;

FIG. 7 illustrates a heat map showing utilization at each pickup time slot during a week for a first store location;

FIG. 8 illustrates a heat map showing utilization at each pickup time slot during a week for a second store location within five miles of the first store location;

Figure 1:
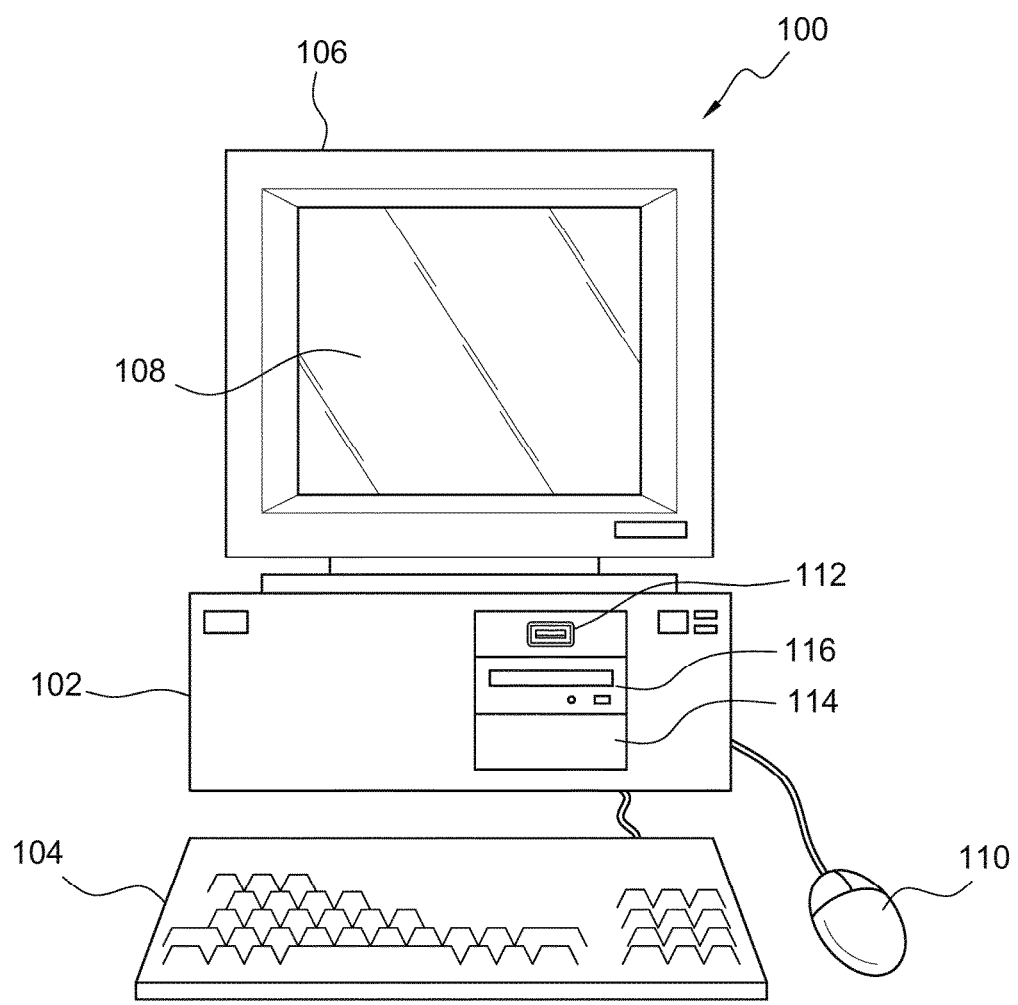
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately 0.1 second, 0.5 second, one second, two seconds, five seconds, or ten seconds.

DESCRIPTION OF EXAMPLES OF EMBODIMENTS

Figure 2:
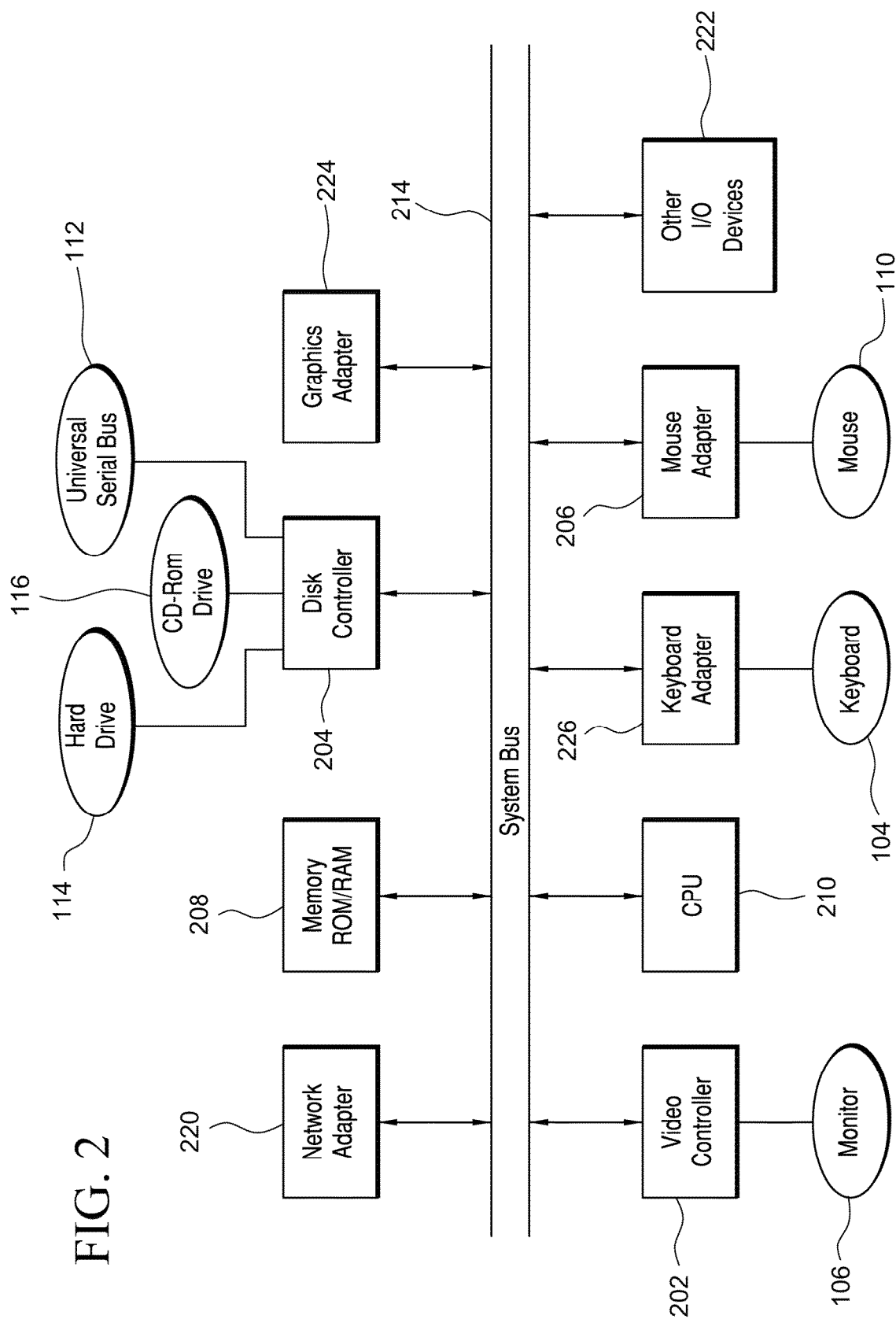
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, or (v) the Windows Mobile™ operating system by Microsoft Corp. of Redmond, Washington, United States of America.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
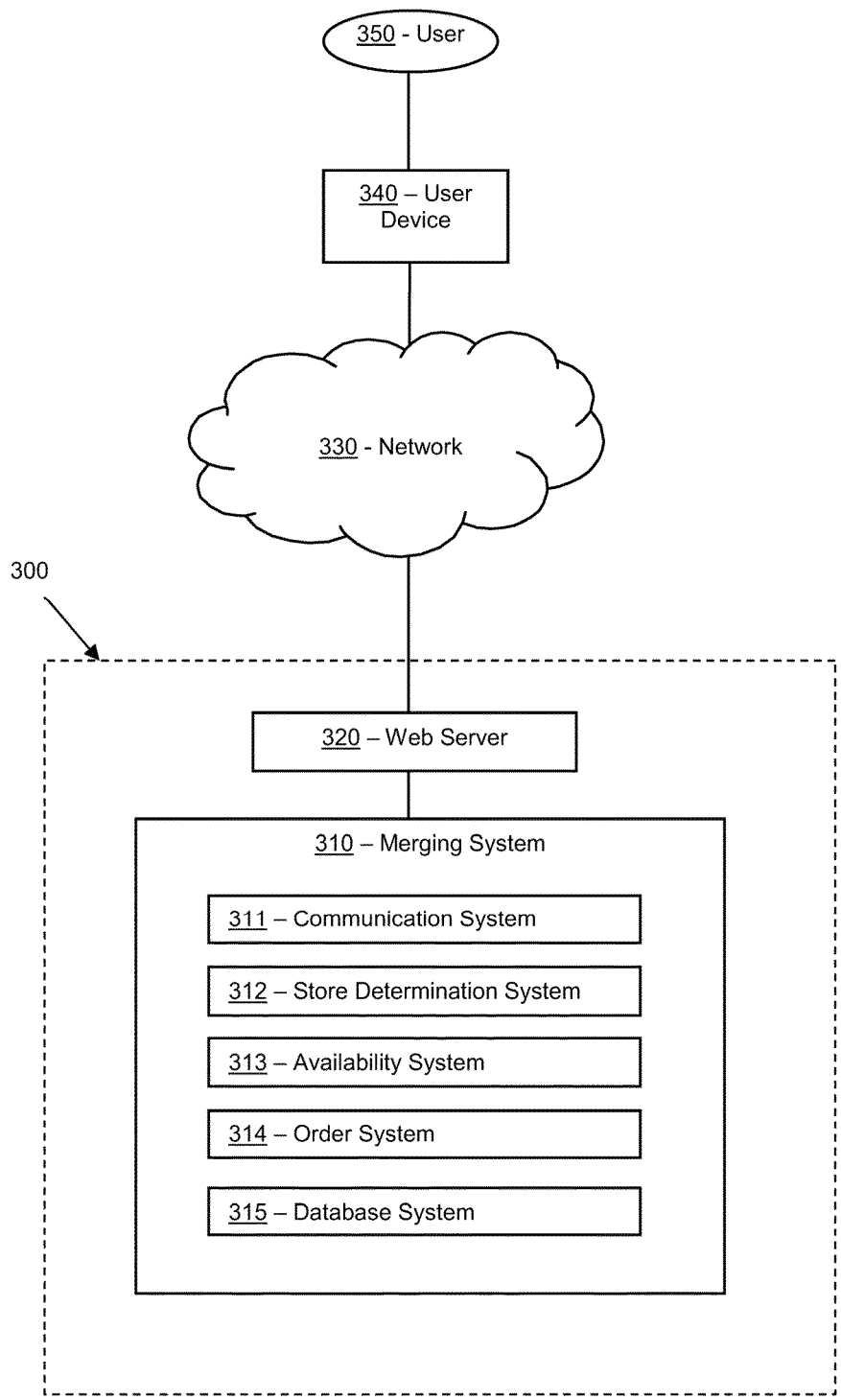
FIG. 3 illustrates a block diagram of a system that can be employed for automatically merging pickup and delivery time slots from nearby stores, according to an embodiment.

Turning ahead in the drawings, FIG. 3 illustrates a block diagram of a system 300 that can be employed for automatically merging pickup and delivery time slots from nearby stores, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a merging system 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Merging system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host merging system 310 and/or web server 320. Additional details regarding merging system 310 and/or web server 320 are described herein.

In some embodiments, web server 320 can be in data communication through a network 330 with one or more user devices, such as a user device 340. User device 340 can be part of system 300 or external to system 300. Network 330 can be the Internet or another suitable network. In some embodiments, user device 340 can be used by users, such as a user 350. In many embodiments, web server 320 can host one or more websites and/or mobile application servers. For example, web server 320 can host a web site, or provide a server that interfaces with an application (e.g., a mobile application), on user device 340, which can allow users (e.g., 350) to browse and/or search for items (e.g., products, grocery items), to add items to an electronic cart, to purchase items, to request pickup (e.g., grocery pickup), and/or to request delivery (e.g., grocery delivery), in addition to other suitable activities. In a number of embodiments, web server 320 can interface with merging system 310 when a user (e.g., 350), such as a customer, requests pickup or delivery.

In some embodiments, an internal network that is not open to the public can be used for communications between merging system 310 and web server 320 within system 300. Accordingly, in some embodiments, merging system 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, merging system 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to merging system 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of merging system 310 and/or web server 320. In a similar manner, the processors and/or the non-transitory computer-readable media can be local and/or remote to each other.

Meanwhile, in many embodiments, merging system 310 and/or web server 320 also can be configured to communicate with one or more databases, such as a database system 315. The one or more databases can include a product database that contains information about time slot utilization, capacity, nearby stores, and/or other suitable information, as described below in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, merging system 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, merging system 310 can include a communication system 311, a store determination system 312, an availability system 313, an order system 314, and/or database 315. In many embodiments, the systems of merging system 310 can be modules of computing instructions (e.g., software modules) stored at non-transitory computer readable media that operate on one or more processors. In other embodiments, the systems of merging system 310 can be implemented in hardware. Merging system 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host merging system 310 and/or web server 320. Additional details regarding merging system 310 the components thereof are described herein.

Conventionally, when an online grocery customer places an order, the customer can be asked to choose a time slot for picking up the order from a retail store or having the order delivered to the home of the customer, such as through a delivery service that picks up the order from the retail store and delivers the order to the customer. Same day ordering has become increasingly popular. As the use of online ordering with retail pickup (e.g., online grocery) has increased, various time slots at various stores have become more popular than others. Some stores tend to be much busier for picking up orders as compared to other stores. For stores that are highly utilized, customers are often not able to get popular slots at the last minute (e.g., on the same day). For stores that are low utilized, resources go unutilized, which can result in higher costs. These challenges can result in lost sales. For example, if a customer is trying to shop at the last minute, the customer is often not able to choose an available time slot at the preferred store of the customer. Some customers prefer to be able to place orders at the last minute and nonetheless still be able to select pickup and/or delivery times of their choice without paying more when selecting a popular time slot. Some customers will choose to order elsewhere (e.g., at competitors) if they cannot select a preferred pickup time, which can result in lost sales.

In a number of embodiments, merging system 310 can be used to address these challenges. By using primary and nearby store locations, corresponding store capacities, and real-time time slot order data, merging system 310 can offer improved time slot availability that can advantageously show a consolidated view of available time windows at the primary store and nearby stores, can smoothen demand across stores within a region, and/or can provide transparency and increased same day slot availability to the customer.

At a retailer, almost 40% of stores that have utilization above 85% have a nearby store within 5 minutes of the store. Utilization can be defined as the average number of orders across the time slots divided by the average capacity across the time slots. Of the stores that have utilization about 85%, 27% of those stores have a nearby store within 5 miles that has utilization below 85%. The proximity of these stores that are not as highly utilized to the stores that are highly utilized creates an opportunity to even out demand across stores. Additionally, there are a set of common customers who shop from multiple stores. For example, 130 stores can have high utilization above 85% and also have a nearby store within 5 miles that has utilization below 85%, with an average of 92% utilization There can be 170 of these nearby stores with utilization below 70%, with an average of 70% utilization. There can be 500,000 customers that shop at the 130 stores, and there can be 370,000 customers that shop at the 170 stores, with an overlap of 100,000 customers that shop at both sets of stores, which indicates that customers can be open to shopping at nearby stores in addition to the primary store of the customer. By providing customers with the option to pick up their orders at these nearby stores at time slots that are no longer available the primary store, the demand can be spread across these stores more evenly.

Turning ahead in the drawings, FIG. 4 illustrates a flow chart for a method 400, according to an embodiment. In some embodiments, method 400 can be a method of automatically merging pickup and delivery time slots from nearby stores. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3), merging system 310 (FIG. 3), and/or web server 320 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of system 300. The processor(s) can be similar or identical to the processor(s) described above with respect to computer system 100 (FIG. 1).

In some embodiments, method 400 and other activities in method 400 can include using a distributed network including distributed memory architecture to perform the associated activity. This distributed architecture can reduce the impact on the network and system resources to reduce congestion in bottlenecks while still allowing data to be accessible from a central location.

Referring to FIG. 4, method 400 can include an activity 410 of determining a primary store and one or more secondary stores for pickup of an order of a user, based at least in part on a pickup type of the order. The user can be similar or identical to user 350 (FIG. 3). The order can be an online order from the user that will be picked up at a physical store location. In many embodiments, the pickup type of the order can be "user pickup," also referred to simply as "pickup," which can be the user picking up the order at the store, or instead can be "delivery-service pickup," also referred to simply as "delivery," which can be a delivery service picking up the order at the store and delivering the order to the user, such as at a residence of the user. In many embodiments, activity 410 can be implemented at show in FIG. 5, described below. In some embodiments, the determination of secondary (e.g., nearby) stores can be performed for either pickup type. In other embodiments, the determination of secondary stores can be performed for the pickup type of user pickup and not for the pickup type of delivery-service pickup.

Proceeding to the next drawing, FIG. 5 illustrates a flow chart for activity 410 of determining a primary store and one or more secondary stores for pickup of an order of a user, based at least in part on a pickup type of the order. Activity 410 is merely exemplary and is not limited to the embodiments presented herein. Activity 410 can be employed in many different embodiments or examples not specifically depicted or described herein. In some embodiments, the procedures, the processes, and/or the activities of activity 410 can be performed in the order presented. In other embodiments, the procedures, the processes, and/or the activities of activity 410 can be performed in any suitable order. In still other embodiments, one or more of the procedures, the processes, and/or the activities of activity 410 can be combined or skipped.

As shown in FIG. 5, in a number of embodiments, activity 410 can include an activity 510 of receiving, from the user, the pickup type for the order. For example, the user can select "pickup" on a user interface to indicate that the user prefers to pick up the order at the store, or instead, the user can select "delivery" on the user interface to indicate that the user prefers to have a delivery service pick up the order at the store and deliver the order to the user.

In some embodiments, activity 410 also can include an activity 520 of determining the primary store based at least in part on the pickup type for the order. For example, the way that the primary store is determined can be different depending on the pickup type selected by the user. In a number of embodiments, activity 520 of determining the primary store based at least in part on the pickup type for the order can include, when the pickup type is user pickup, determining the primary store based at least in part on a store selection by the user. For example, when the user selects the "pickup" option as the pickup type, the user can be asked what store the user prefers as their primary store, or this information could be stored from previous orders or other online activity by the user. This selection of primary store can be used for the primary store.

In several embodiments, activity 520 of determining the primary store based at least in part on the pickup type for the order can include, when the pickup type is delivery-service pickup, determining the primary store based at least in part on a closest store to an address of the user. For example, when the user selects the delivery, the user can be asked for an address of the user for the delivery, or this address could be saved from previous orders or other online activity of the user. The primary store can be determined based on a store that is closest to the address, which can be closest by absolute distance, closest by driving distance, closest by driving time, or another suitable measurement of closest.

In a number of embodiments, activity 410 further can include an activity 530 of determining the one or more secondary stores based at least in part on the pickup type for the order. For example, the way that the secondary stores are determined can be different depending on the pickup type selected by the user. In several embodiments, activity 530 of determining the one or more secondary stores based at least in part on the pickup type for the order can include, when the pickup type is user pickup, determining the one or more secondary stores based at least in part on one or more closest stores to the primary store. For example, the stores that are the closest by absolute distance, closest by driving distance, closest by driving time, or another suitable measurement of closest to the primary store can be included in the secondary stores.

In a number of embodiments, activity 530 of determining the one or more secondary stores based at least in part on the pickup type for the order can include, when the pickup type is delivery-service pickup, determining the one or more secondary stores based at least in part on the address of the user falling within respective delivery regions of the one or more secondary stores. In a number of embodiments, each store can have a delivery region that applies to that store, which can include those addresses to which the delivery services can delivery orders that have been picked up the delivery service at the store. In many cases, these delivery regions for nearby stores can have some overlapping regions, such that an address can be included in two, three, four, or more delivery regions of different stores.

In some embodiments, determining the one or more secondary stores can further include determining the one or more secondary stores based at least in part on a store type of the primary store. For example, stores within a chain of stores can have different type. For example, the chain of stores can include (1) superstores, which can be a combination of a department store and a grocery store, with a wide selection of groceries, and (2) smaller grocery stores, which can have a more limited selection of groceries than a superstore. If the user has selected a superstore as the primary store of the user, then the smaller grocery stores may not carry many of the items the user typically orders at the superstore. In a number of embodiments, secondary stores can be selected from superstores and not smaller grocery stores when the primary store of the user is a superstore, and secondary stores can be selected from superstores and smaller grocery stores when the primary store of the user is a smaller grocery store. In other embodiments, secondary stores can be selected from smaller grocery stores but not superstores when the primary store of the user is a smaller grocery store, as the user can prefer to go to smaller stores. In yet other embodiments, other suitable combination can be allowed or disallowed.

In various embodiments, the secondary stores can be determined when a request is made to view the available time slots. In some cases, a user can select the time slot before selecting the items in the order, and in other cases, the user can select the time slot after selecting some or all of the items in the order (e.g., before or at checkout). In some cases, the request to view the available time slots can include a flag that indicates whether to determine available time slots at the primary store alone or instead to determine available time slots at the primary store and nearby stores. In some embodiments, the request can include a maximum number of nearby stores to include, such as 1, 2, 3, 4, 5, or another suitable number. This maximum number of nearby stores can be a configurable parameter. When the flag indicates that nearby stores should be included, processing of the request can differ depending on the pickup type. If the pickup type is delivery-service pickup, then a process can determine stores having a delivery region that includes the address. These stores can be ranked by the closest to the address, up to the maximum nearby stores.

If instead the pickup type is user pickup, then a process can determine the nearby stores based on how close those stores are to the primary store. In several embodiments, the one or more closest stores to the primary store can be cached each day, such that the closest stores can be retrieved from a cache for quick lookup. This cache strategy can be implemented as shown in FIG. 6, described below.

Figure 6:
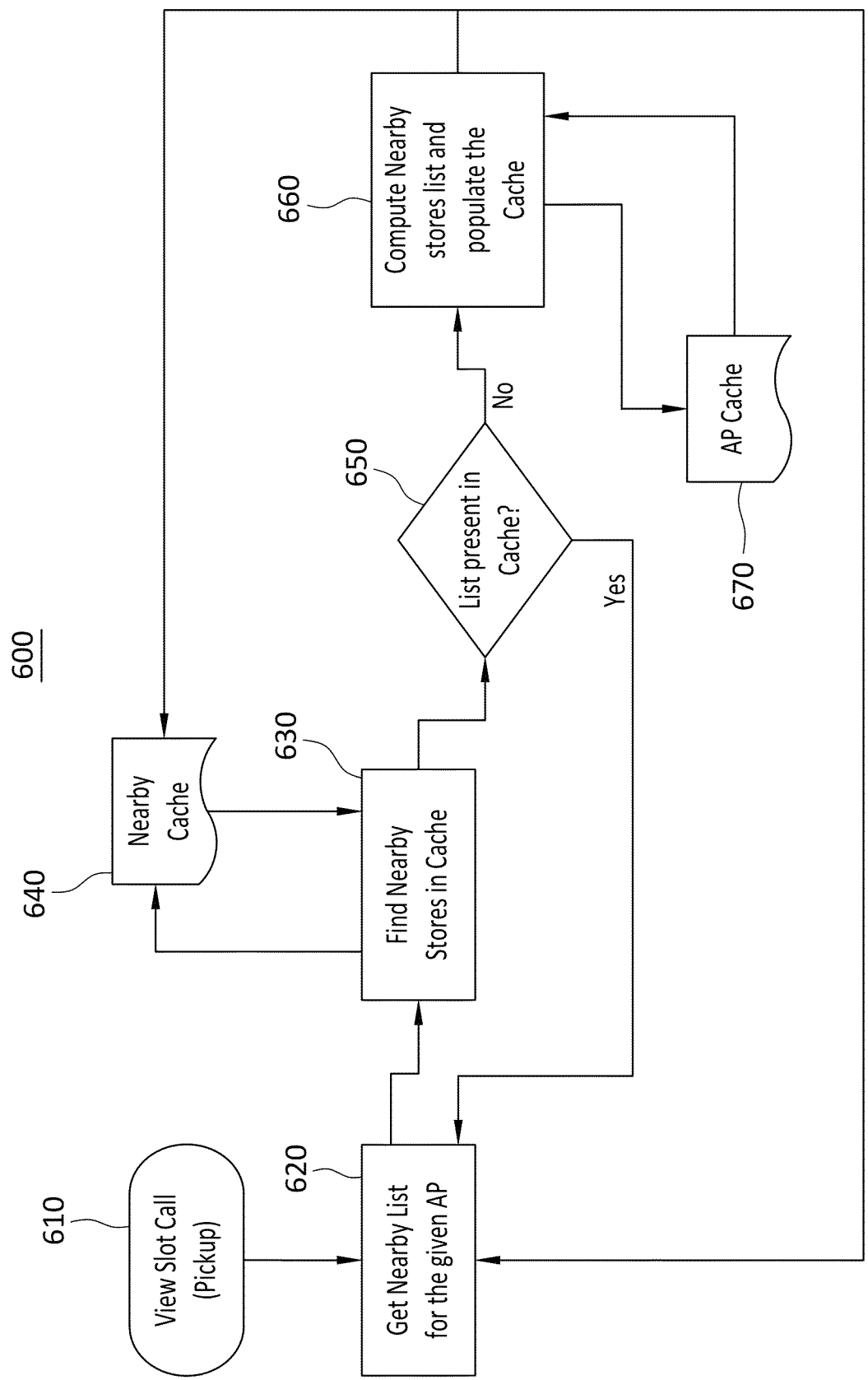
FIG. 6 illustrates a flow chart of a method for determining closest stores to a primary store using a caching strategy.

Turning ahead in the drawings, FIG. 6 illustrates a flow chart of a method 600 for determining closest stores to a primary store using a caching strategy. Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped.

In many embodiments, method 600 can begin with an activity 610 of receiving a call to view the closest stores to a primary store when the user has selected the pickup type of user pickup. Each store can have one or more access points (APs), which can be user pickup, delivery-service pickup, express pickup, or other suitable types of access. In some embodiments, method 600 next can include an activity 620 of retrieving a nearby list for the given AP, namely user pickup at the primary store. In a number of embodiments, activity 620 can include an activity 630 of finding nearby stores in cache. In a number of embodiments, activity 630 can perform a look-up call to a nearby cache 640. Method 600 then can include an activity 650 of determining if a list of closest stores is present was retrieved in the look-up call to nearby cache 640. If yes, then the list can be returned to activity 620. If no, then the closest stores can be computed by making a look-up call to an AP cache 670. In a number of embodiments, AP cache 670 can include all the access points that are available for the chain of stores, along with the location of the stores. The access points from this look up call can be returned to activity 660, which can proceed by filtering out access points that are not yet operational for customers, and then determining, from the start date (e.g., the current date or the following date) up to the end date (e.g., 6 days after the start date (in order to pull a week of data), or another suitable date), a stores for each day that satisfy the criteria. For example, to determine the closest stores by absolute distance to the primary store, up to a maximum number of stores, such as 5, the APs that have pickup as an option that are closest to the primary store, up to 5 stores, will be determined. If no stores are found, the list will be empty. This list can then be stored in nearby cache 640 and returned to activity 620.

For example, the cache key can be of the form "AP0-startDate-endDate" and the value for each entry can hold the nearby APs for each day in this range, as such as follows:

```
{
    "2000-01-01": [
        "AP1",
        "AP2"
    ],
    "2000-01-02": [
        "AP1",
        "AP2"
    ],
    "2000-01-03": [
        "AP1",
        "AP2"
    ],
    "2000-01-04": [
        "AP1",
        "AP2"
    ],
    "2000-01-05": [
        "AP1",
        "AP3"
    ],
    "2000-01-06": [
        "AP3",
        "AP4"
    ],
    "2000-01-07": [
        "AP3",
        "AP4"
    ]
}
```

This cache entry can be invalidated once a day, such as at 12 am PST, or at other suitable times, in order to be updated based on fresh AP information, as a new AP may have become active. A fresh computation can happen once a new store becomes active. The value fetched from AP cache 670 can be converted to a usable form in code to be stored in nearby cache 640, such as follows:

```
{
    {
        "resourceId": "AP1",
        "startDate": "2000-01-01",
        "endDate": "2000-01-05"
    },
    {
        "resourceId": "AP2",
        "startDate": "2000-01-01",
        "endDate": "2000-01-04"
    },
    {
        "resourceId": "AP3",
        "startDate": "2000-01-05",
        "endDate": "2000-01-07"
    },
    {
        "resourceId": "AP4",
        "startDate": "2000-01-06",
        "endDate": "2000-01-07"
    }
}
```

Returning to FIG. 4, in a number of embodiments, method 400 also can include an activity 420 of determining real-time availabilities of first time slots at the primary store and real-time availabilities of second time slots at the one or more secondary stores. In many embodiments, the first time slots can be time slots for the specified pickup type at the primary store during a time period, such as the next seven days. In several embodiments, the second time slots can be time slots for the specified pickup type at the secondary stores during the same time period. At least some of the first time slots can be at the same time as at least some of the second time slots, and in some cases, the first time slots all be at the same time as all of the second time slots. In many embodiments, the real-time availability of a time slots can be based on whether or not the time slot is filled to capacity with orders (i.e., unavailable) or not yet filled to capacity (i.e., available). This determination can be made in real-time when the time slots are retrieved to present a list of time slots to the user for selection of a time slot.

Turning ahead in the drawings, FIG. 7 illustrates a heat map 700 showing utilization at each pickup time slot during a week for a first store location. FIG. 8 illustrates a heat map 800 showing utilization at each pickup time slot during a week for a second store location within five miles of the first store location. In many embodiments, as shown in heat maps 700 and 800, each pickup time slot can be a one-hour time slot. In other embodiments, each pickup time slot can be a different suitable time period, such 15 minutes, 30 minutes, 45 minutes, 90 minutes, or 2 hours, for example. Heat maps 700 and 800 can indicate a level of utilization for each time slot, with red indicating very high utilization and green indicating low utilization. Heat maps 700 and 800 show that the first store location is generally very busy and is more utilized that the second store location, which is relatively less busy.

Consider a scenario of two different types of customers, namely single-store customer and a multi-store customer. A first customer can be a single-store customer that orders online for pickup at the first store location, and if he does not get the time slot of his choice, he will shop instead at a competitor rather than at the second store. A second customer can be a single-store customer that orders online for pickup at the second store location, and if he does not get the time slot of his choice, he will shop instead at a competitor rather than at the first store. A third customer can be a multi-store customer that flexible to order for pickup from either the first store location or the second store location, because of her proximity to both stores. If the third customer is order online last minute (e.g., same day) for pickup at the first store location on Monday evening at 4-5 pm, she will not be able to get that time slot, as it is unavailable. She is looking for other options, but is not aware of them. By making her aware of the availability of a time slot at the second store location on Monday evening at 4-5 pm in the same checkout experience and/or the same time slot selection process, she can be more likely to use the second store location than to shop instead at a competitor.

Returning to FIG. 4, in several embodiments, method 400 additionally can include with an activity 430 of generating a list of available time slots comprising at least a portion of the first time slots at the primary store and at least a portion of the second time slots at the one or more secondary stores. In many embodiments, generating the list of available time slots can be based at least in part on the real-time availabilities of the first time slots at the primary store and the real-time availabilities of the second time slots at the one or more secondary stores. For example, the first time slots at the primary store can be traversed, and each time slot this is available can be added to the list. For those time slots that are not available at the primary store, a time slot of the secondary stores that corresponds to the same time as the unavailable time slot at the primary store can be used. In many embodiments, the highest ranked secondary store (e.g., closest store to the primary store) can be used first, if more than one secondary store has an available time slot at the time.

In a number of embodiments, generating the list of available time slots further can include replacing unavailable time slots at the primary store during a predetermined time period with the at least the portion of the second time slots at the one or more secondary stores. In a number of embodiments, the predetermined time period can be no more than 1 day, 2 days, 3 days, 4 days, 5 days, 6 days, or another suitable number of days. For example, even though the user may be presented with time slots over the next seven days, to save computing resources, finding available time slots at secondary stores to replace unavailable time slots at the primary store can done for the first day alone, or the first two days, but not the remaining days of the week, as many customers choosing a time slot further out would prefer to use their preferred slot location.

In a number of embodiments, method 400 further can include an activity 440 of facilitating displaying to the user a user interface comprising at least a portion of the list of available time slots. A display of the user interface can be similar or identical to user interface display 900 (FIG. 9, described below) and/or user interface display 1000 (FIG. 10, described below). In some embodiments, when the pickup type is user pickup, the user interface further can include (1) a description of the primary store, (2) a notification that the list of available time slots includes time slots from nearby stores, and/or (3) a description of each of the one or more secondary stores associated with the at least the portion of the second time slots. In a number of embodiments, when the pickup type is delivery-service pickup, information about the primary store and/or secondary stores (e.g., nearby stores) is not included in the user interface, as that information is relevant to the delivery service, but not to the user. In other embodiments, information about the primary store and/or secondary stores can be included in the user interface for the pickup type of delivery-service pickup.

Figure 9:
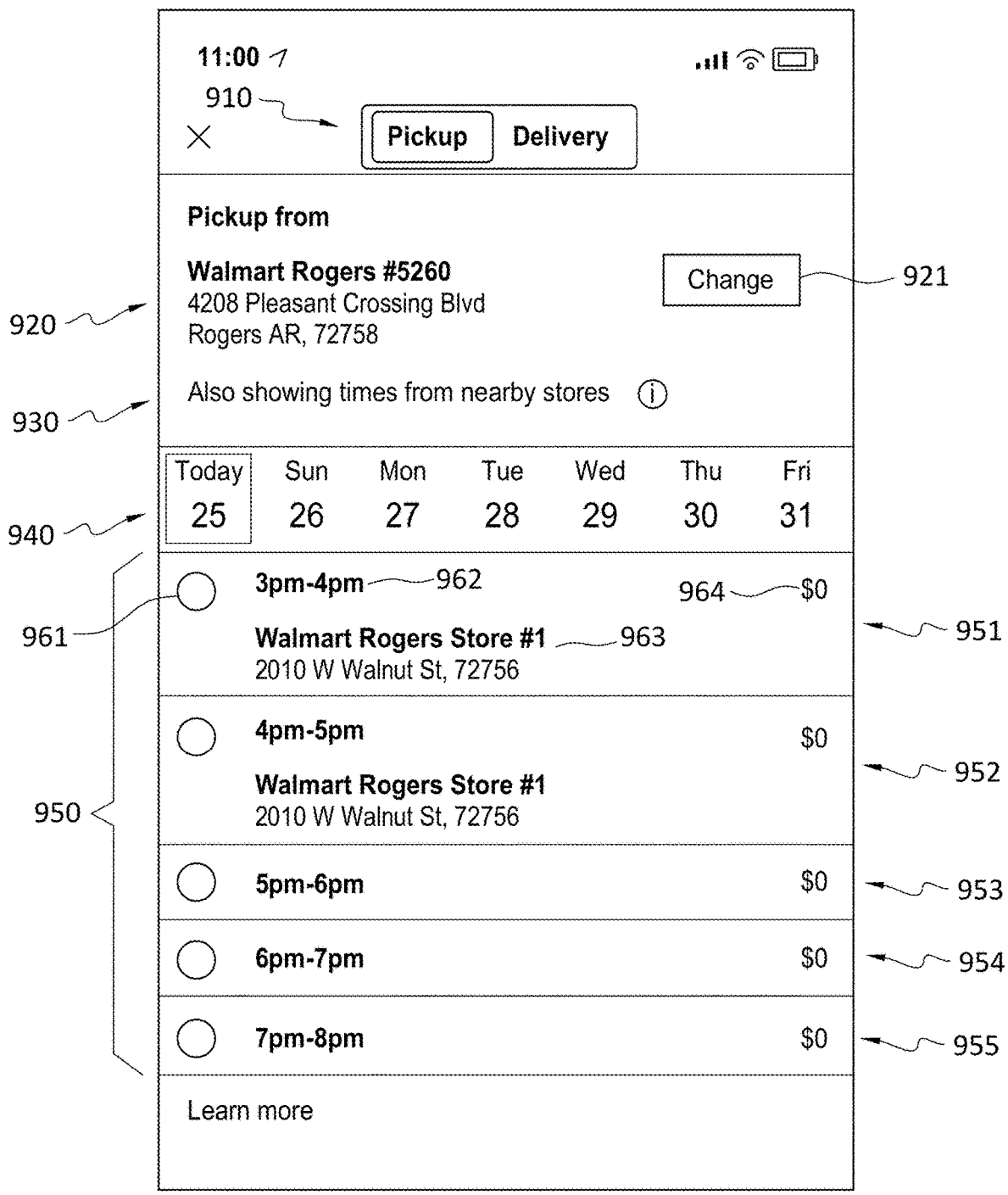
FIG. 9 illustrates an exemplary user interface display to allow a user to select a pickup time slot for pickup by the user.
Figure 10:
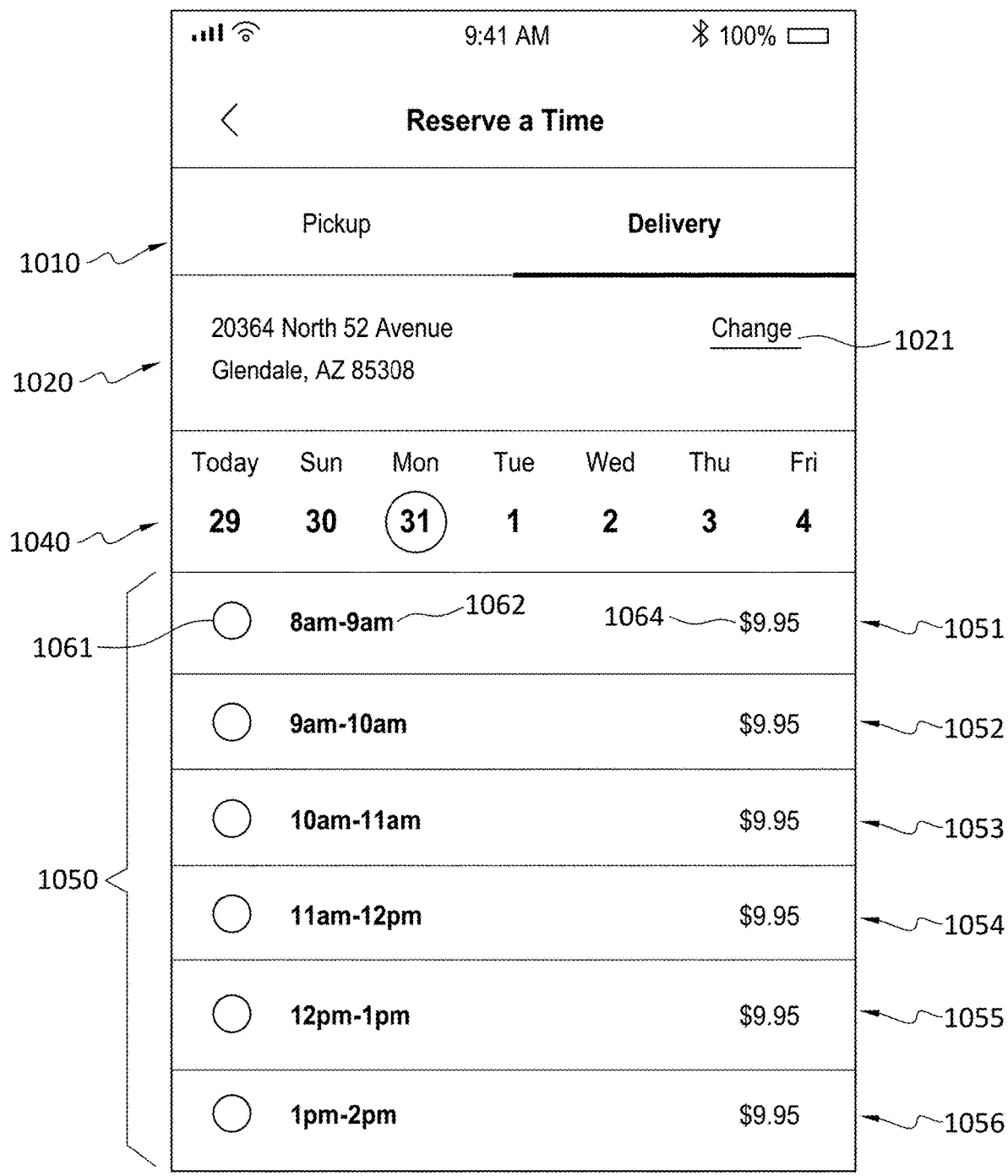
FIG. 10 illustrates an exemplary user interface display to allow a user to select a pickup time slot for pickup by a delivery service.

Turning ahead in the drawings, FIG. 9 illustrates an exemplary user interface display 900 to allow a user to select a pickup time slot for pickup by the user. User interface display 900 is merely exemplary, and embodiments of the user interface display are not limited to the embodiments presented herein. The user interface display can be employed in many different embodiments or examples not specifically depicted or described herein, and can include other suitable elements. In many embodiments, user device 340 (FIG. 3) can display user interface display 900 to user 350 (FIG. 3), which can include a form that allows the user to select a pickup time slot.

In a number of embodiments, user interface display 900 can include a pickup type selector 910, a primary store descriptor 920, a primary store change button 921, a nearby store notification 930, a date selector 940, and/or a time slot listing 950. In some embodiments, pickup type selector 910 can allow the user to select either pickup or delivery, to indicate whether the user will be pickup up the order at the retail store, or if the user instead prefers that a delivery service pick up the order at the retail store and deliver the order to the user. As shown in FIG. 9, the user can select the pickup option. In many embodiments, primary store descriptor 920 can include a description of the primary store, such as a name of the store, an address of the store, and/or other suitable information. In several embodiments, the user can change the primary store using primary store change button 921. In a number of embodiments, when time slots for secondary stores (e.g., time slots for stores that are nearby the primary store) are included in time slot listing 950, user interface display can include nearby store notification 930 to indicate to the user that some of the time slots are for stores other than the primary store.

In a number of embodiments, date selector 940 can allow the user to select a date in order to display pickup time slots that are available on that date. For example, the user can select a date within the current week, starting on the current date or the day after the current date. In a number of embodiments, time slot listing 950 can include time slot options to allow the user to view information about time slots and/or select time slots that are available on the date selected using date selector 940. For example, as shown in user interface display 900, time slot listing 950 can include a time slot option 951 for 3-4 pm, a time slot option 952 for 4-5 pm, a time slot option 953 for 5-6 pm, a time slot option 954 for 6-7 pm, and a time slot option 955 for 7-8 pm. In many embodiments, one or more of the time slots options can be for time slots at one or more secondary stores. For example, time slot options 951 and 952 can be for time slots at a secondary store, while time slot options 953-955 can be for time slots at the primary store.

In a number of embodiments, each time slot option (e.g., 951-955) can include various selectors and/or other information about the time slot associated with the time slot option. For example, time slot option 951 can include a selector 961, a time descriptor 962, a secondary store descriptor 963, a price indicator 964, and/or other suitable information. Selector 961 can be a radio button that allows the user to select time slot option 951. Time descriptor 962 can display the time range that applies to time slot option 951, such as 3-4 pm. Secondary store descriptor 963 can display a description of the secondary store associated with the time slot option, such as a name of the secondary store, an address of the secondary store, and/or other suitable information. In many embodiments, a secondary store descriptor (e.g., 963) is shown when the time slot is for a secondary store, but not when the time slot is for a primary store. Price indicator 964 can display the price that applies to time slot option 951. In some cases, the price can be free ($0). In other cases, the price can be another suitable amount, such as a surcharge that can apply to popular time slots. In many embodiments, once the user selects a time slot option (e.g., 951-955), such as by using selector 961, the time slot associated with that time slot option can be used for pickup at the store.

In many embodiments, user interface display 900 can provide options to users to use stores other than the primary store, and can integrate these options seamlessly into the existing time selection process, such that the user can select a time slot at a nearby store without changing the primary store. Multi-store users and/or users with flexibility can be made aware of these available time slots (e.g., time slots represented by time slots options 951-952) at the nearby stores, such that those users can consider these readily consider these options without changing the primary store to other nearby stores. This integrated user interface can provide advantages over past user interfaces, in which the user would change the primary store to other stores to see the time slots available at those stores. By making time slots at nearby stores readily accessible to users, demand across stores can be spread out more evenly, which can allow single-store users to be able to select time slots at their preferred store locations, even for same-day orders, while also allowing multi-store users to readily select time slots at either their primary stores or secondary stores.

Turning ahead in the drawings, FIG. 10 illustrates an exemplary user interface display 1000 to allow a user to select a pickup time slot for pickup by a delivery service. User interface display 1000 is merely exemplary, and embodiments of the user interface display are not limited to the embodiments presented herein. The user interface display can be employed in many different embodiments or examples not specifically depicted or described herein, and can include other suitable elements. In many embodiments, user device 340 (FIG. 3) can display user interface display 1000 to user 350 (FIG. 3), which can include a form that allows the user to select a pickup time slot. User interface display 1000 can be similar to user interface display 900 (FIG. 9), and various elements of user interface display 1000 can be similar or identical to various elements of user interface display 900 (FIG. 9).

In a number of embodiments, user interface display 1000 can include a pickup type selector 1010, a primary store descriptor 1020, a primary store change button 1021, a date selector 1040, and/or a time slot listing 1050. Pickup type selector 1010 can be similar or identical to pickup type selector 910 (FIG. 9). Primary store descriptor 1020 can be similar or identical to primary store descriptor 920 (FIG. 9). Primary store change button 1021 can be similar or identical to primary store change button 9021 (FIG. 9). Date selector 1040 can be similar or identical to date selector 940 (FIG. 9). Time slot listing 1050 can be similar or identical to time slot listing 950 (FIG. 9).

In some embodiments, pickup type selector 1010 can allow the user to select either pickup or delivery, to indicate whether the user will be pickup up the order at the retail store, or if the user instead prefers that a delivery service pick up the order at the retail store and deliver the order to the user. As shown in FIG. 10, the user can select the delivery option. In many embodiments, primary store descriptor 1020 can include a description of the primary store, such as a name of the store, an address of the store, and/or other suitable information. In several embodiments, the user can change the primary store using primary store change button 1021. In other embodiments, the primary store location is not displayed and the user is not given the option to change the primary store, as it can be determined based on the address of the user, as described above.

In a number of embodiments, date selector 1040 can allow the user to select a date in order to display pickup time slots that are available on that date. For example, the user can select a date within the current week, starting on the current date or the day after the current date. In a number of embodiments, time slot listing 1050 can include time slot options to allow the user to view information about time slots and/or select time slots that are available on the date selected using date selector 1040. For example, as shown in user interface display 1000, time slot listing 1050 can include a time slot option 1051 for 8-9 am, a time slot option 1052 for 9-10 am, a time slot option 1053 for 10-11 am, a time slot option 1054 for 11 am-12 pm, a time slot option 1055 for 12-1 pm, and a time slot option 1056 for 1-2 pm. In many embodiments, one or more of the time slots options can be for time slots at one or more secondary stores, but, in many embodiments, information about the secondary stores is not displayed for the time slots.

In a number of embodiments, each time slot option (e.g., 1051-1056) can include various selectors and/or other information about the time slot associated with the time slot option. For example, time slot option 1051 can include a selector 1061, a time descriptor 1062, a price indicator 1064, and/or other suitable information. Selector 1061 can be similar or identical to selector 961 (FIG. 9). Time descriptor 1062 can be similar or identical to time descriptor 962 (FIG. 9). Price indicator 1064 can be similar or identical to price indicator 964 (FIG. 9).

Selector 1061 can be a radio button that allows the user to select time slot option 1051. Time descriptor 1062 can display the time range that applies to time slot option 1051, such as 3-4 pm. Price indicator 1064 can display the price that applies to time slot option 1051. In some cases, for example, the price can be the amount that applies to pay for the delivery service, which can be $9.95 or another suitable amount. In many embodiments, once the user selects a time slot option (e.g., 1051-1056), such as by using selector 1061, the time slot associated with that time slot option can be used for the delivery service to pick up the order at the store and delivery the order to the user.

Returning to FIG. 4, in several embodiments, method 400 optionally can further include with an activity 450 of receiving a selection of a time slot from the user. For example, after a user has selected a time slot, such as by using selector 961 (FIG. 9) or selector 1061 (FIG. 10), that selection can be received. In a number of embodiments, the time slot can be one of the second time slots at the one or more secondary stores.

In a number of embodiments, method 400 further can include an activity 460 of determining whether all items in the order are available at a secondary store of the one or more secondary stores associated with the time slot. In many cases, the time slot selection can be made after the user has already entered items for the order (e.g., populated the cart with items). These items can be selected from items available at the primary store. When the user selects a time slot at a secondary store, one or more of the items in the order may not be available at the secondary store. Activity 460 can involve determining if each of the items in the cart is available at the secondary store, based on the inventory of items stored in an inventory database for the secondary store. When there are one or more items that are not available at the secondary store, method 400 can continue with an activity 470, described below. Otherwise, method 400 can continue with an activity 480, described below.

In several embodiments, method 400 optionally can further include with activity 470 of facilitating displaying to the user one or more items that are not available at the secondary store. For example, if two items in the order are not available at the secondary store, then those two items can be displayed to the user. In many embodiments, these items can be displayed to the user in a user interface display, which can be similar or identical to user interface display 1100 (FIG. 11, described below.

Figure 11:
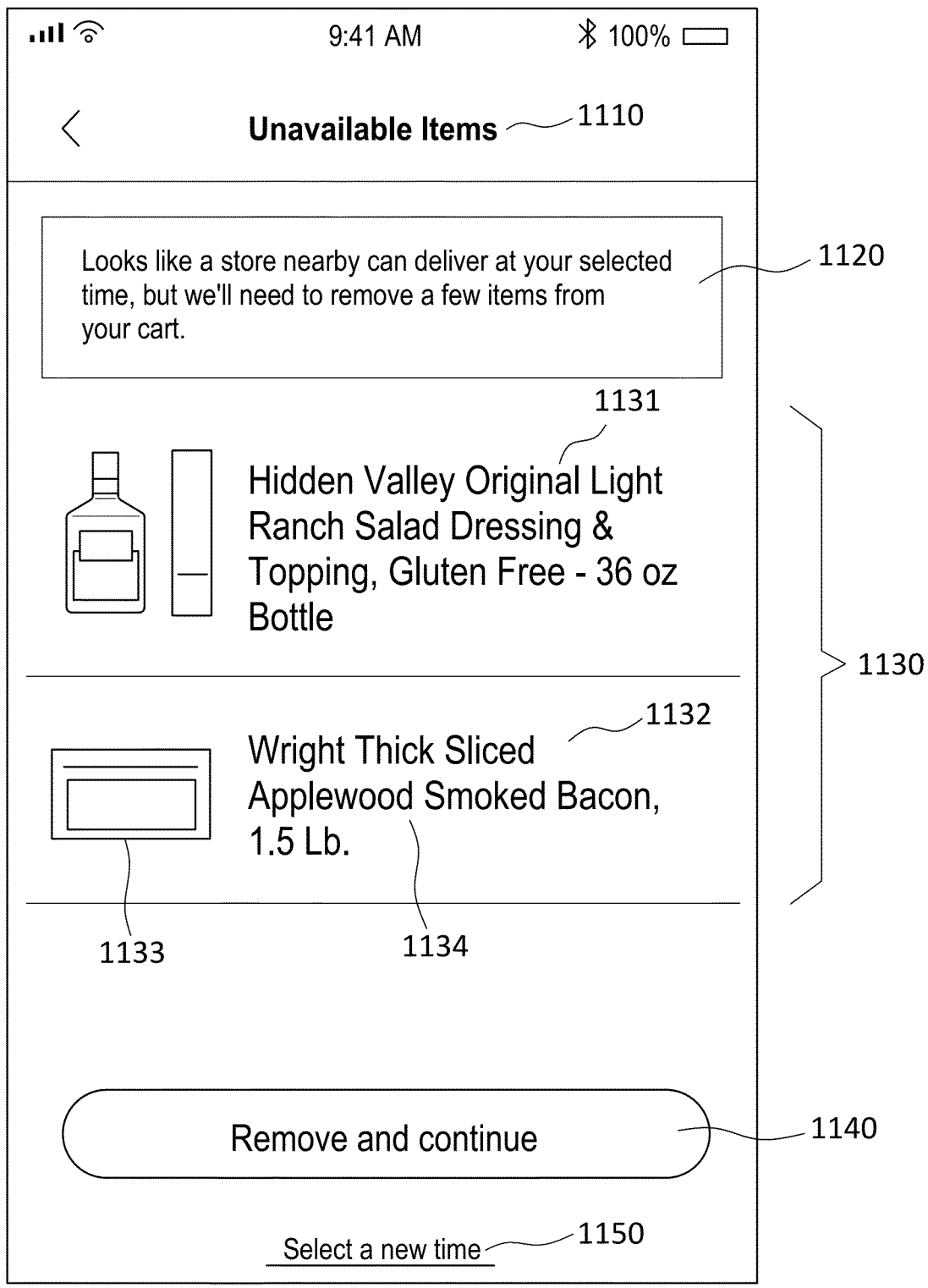
FIG. 11 illustrates an exemplary user interface display to display to a user items that are not available at the secondary store associated with the selected time slot.

Turning ahead in the drawings, FIG. 11 illustrates an exemplary user interface display 1100 to display to a user items that are not available at the secondary store associated with the selected time slot. User interface display 1100 is merely exemplary, and embodiments of the user interface display are not limited to the embodiments presented herein. The user interface display can be employed in many different embodiments or examples not specifically depicted or described herein, and can include other suitable elements. In many embodiments, user device 340 (FIG. 3) can display user interface display 1100 to user 350 (FIG. 3), which can include a page showing the unavailable items.

In a number of embodiments, user interface display 1100 can include a header 1110, a notice 1120, an item listing 1130, a button 1140, and/or a button 1150. Header 1110 can provide a short title for the page shown in user interface display 1100, such as "Unavailable Items." Notice 1120 can include a description of why the page shown in user interface display 1100 is being displayed. For example, the description can indicate that a secondary store can be used for the select time slot, but that some of the items are not available at that secondary store.

Item listing 1130 can include one or more item indicators, such as item indicators 1131 and 1132. In some embodiments, each item indicator (e.g., 1131-1132) can include information about the item. For example, item indicator 1131 can include a photo 1133 and a descriptor 1134 of the item associated with item indicator 1132. In some embodiments, button 1140 can allow the user to accept that these items in item listing 1130 will not be included in the order to be picked up and/or delivered from the secondary store. By clicking button 1140, the items in item listing 1130 can be removed from the order, and the user can continue with the order and/or checkout process. In a number of embodiments, button 1150 can allow the user to reject the selected time slot, such as because the user is unwilling to use a secondary store in which one or more of the items in item listing 1130 are unavailable. By clicking button 1150, the items in item listing 1130 can be retained in the order, and the user can return to selecting a time slot, such as shown in FIG. 9 or 10.

In a number of embodiments, method 400 further can include, after activity 460 or activity 470, performing activity 480 of receiving, from the user, a completion indication for the order. For example, in some embodiments, the user can finish placing the order, such that the order will be processed. In some embodiments, the user can indicate completion of the order using button 1140 (FIG. 11), or a similar button, indicating that the user wants to place the order for the selected time slot. In some embodiments, if a selection of a time slot at a secondary store was received in activity 450 and if activity 470 was performed before activity 480, then the order can be processed as part of activity 480 or after activity 480 without the one or more items that are not available at the secondary store.

Returning to FIG. 3, in several embodiments, communication system 311 can at least partially perform activity 410 (FIG. 4) of determining a primary store and one or more secondary stores for pickup of an order of a user, based at least in part on a pickup type of the order; activity 440 (FIG. 4) of facilitating displaying to the user a user interface comprising at least a portion of the list of available time slots; activity 450 (FIG. 4) of receiving a selection of a time slot from the user; activity 470 (FIG. 4) of facilitating displaying to the user one or more items that are not available at the secondary store; and/or activity 480 (FIG. 4) of receiving, from the user, a completion indication for the order.

In several embodiments, store determination system 312 can at least partially perform activity 410 (FIG. 4) of determining a primary store and one or more secondary stores for pickup of an order of a user, based at least in part on a pickup type of the order.

In a number of embodiments, availability system 313 can at least partially perform activity 420 (FIG. 4) of determining real-time availabilities of first time slots at the primary store and real-time availabilities of second time slots at the one or more secondary stores; and/or activity 430 (FIG. 4) of generating a list of available time slots comprising at least a portion of the first time slots at the primary store and at least a portion of the second time slots at the one or more secondary stores.

In several embodiments, order system 314 can at least partially perform activity 460 (FIG. 4) of determining whether all items in the order are available at a secondary store of the one or more secondary stores associated with the time slot; activity 470 (FIG. 4) of facilitating displaying to the user one or more items that are not available at the secondary store; and/or activity 480 (FIG. 4) of receiving, from the user, a completion indication for the order.

In a number of embodiments, web server 320 can at least partially perform activity 410 (FIG. 4) of determining a primary store and one or more secondary stores for pickup of an order of a user, based at least in part on a pickup type of the order; activity 440 (FIG. 4) of facilitating displaying to the user a user interface comprising at least a portion of the list of available time slots; activity 450 (FIG. 4) of receiving a selection of a time slot from the user; activity 470 (FIG. 4) of facilitating displaying to the user one or more items that are not available at the secondary store; and/or activity 480 (FIG. 4) of receiving, from the user, a completion indication for the order.

Various embodiments can include a system including one or more processors and one or more non-transitory computer-readable media storing computing instructions that, when executed on the one or more processors, perform various acts. The acts can include determining a primary store and one or more secondary stores for pickup of an order of a user, based at least in part on a pickup type of the order. The acts also can include determining real-time availabilities of first time slots at the primary store and real-time availabilities of second time slots at the one or more secondary stores. The acts additionally can include generating a list of available time slots comprising at least a portion of the first time slots at the primary store and at least a portion of the second time slots at the one or more secondary stores, based at least in part on the real-time availabilities of the first time slots at the primary store and the real-time availabilities of the second time slots at the one or more secondary stores. The acts further can include facilitating displaying to the user a user interface comprising at least a portion of the list of available time slots.

A number of embodiments can include a method being implemented via execution of computing instructions configured to run at one or more processors. The method can include determining a primary store and one or more secondary stores for pickup of an order of a user, based at least in part on a pickup type of the order. The method also can include determining real-time availabilities of first time slots at the primary store and real-time availabilities of second time slots at the one or more secondary stores. The method additionally can include generating a list of available time slots comprising at least a portion of the first time slots at the primary store and at least a portion of the second time slots at the one or more secondary stores, based at least in part on the real-time availabilities of the first time slots at the primary store and the real-time availabilities of the second time slots at the one or more secondary stores. The method further can include facilitating displaying to the user a user interface comprising at least a portion of the list of available time slots.

In many embodiments, the techniques described herein can provide a practical application and several technological improvements. In some embodiments, the techniques described herein can provide for automatically merging pickup and delivery time slots from nearby stores. These techniques described herein can provide a significant improvement over conventional approaches of presenting time slots to a user from a single store, and the user changing the store to a different store to see time slot available at other stores.

In many embodiments, the techniques described herein can be used continuously at a scale that cannot be handled using manual techniques. For example, the techniques can be applied to thousands of stores, and the number of time slots that can be handled each week across the stores can exceed a hundred thousand or even a million, and these time slots can be viewed by thousands or millions or customers.

In a number of embodiments, the techniques described herein can solve a technical problem that arises only within the realm of computer networks, as online ordering and selection of time slots for picking up online orders are concepts that do not exist outside the realm of computer networks. Moreover, the techniques described herein can solve a technical problem that cannot be solved outside the context of computer networks. Specifically, the techniques described herein cannot be used outside the context of computer networks, in view of a lack of data.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although automatically merging pickup and delivery time slots from nearby stores has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-11 may be modified, and that the foregoing discussion of certain of these embodiments does not necessarily represent a complete description of all possible embodiments. For example, one or more of the procedures, processes, or activities of FIG. 4-6 may include different procedures, processes, and/or activities and be performed by many different modules, in many different orders. As another example, one or more of the procedures, processes, and/or activities of one of FIGS. 4-6 can be performed in another one of FIGS. 4-6. As another example, the systems within system 300 in FIG. 3 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, cause the one or more processors to perform operations comprising:
determining a primary store and one or more secondary stores for pickup of an order of a user, based at least in part on a pickup type of the order, further comprising:
performing a first lookup call to a first cache of one or more proximate access points based on the primary store;
when a list of the one or more proximate access points is retrieved in the first lookup call, returning the list of the one or more proximate access points to determine the one or more secondary stores; and
when the list of the one or more proximate access points is not retrieved in the first lookup call:
performing a second lookup call to a second cache of active access points, locations of the active access points, start times of the active access points, and end times of the active access points;
determining the one or more proximate access points from among the active access points based on (i) absolute distances between a location of the primary store and the locations of the active access points, and (ii) the start times of the active access points and the end times of the active access points satisfying time window criteria, wherein cache entries in the second cache are invalidated periodically to freshen the second cache; and
storing the one or more proximate access points in the first cache to update the first cache;

determining real-time availabilities of first time slots at the primary store and real-time availabilities of second time slots at the one or more secondary stores;

generating a list of available time slots comprising at least a portion of the first time slots at the primary store and at least a portion of the second time slots at the one or more secondary stores, based at least in part on the real-time availabilities of the first time slots at the primary store and the real-time availabilities of the second time slots at the one or more secondary stores; and facilitating displaying to the user a user interface comprising at least a portion of the list of available time slots.

2. The system of claim 1, wherein the operations further comprise:

receiving a selection of a time slot from the user, wherein the time slot is one of the second time slots at the one or more secondary stores;

determining whether all items in the order are available at a secondary store of the one or more secondary stores associated with the time slot;

facilitating displaying to the user one or more items that are not available at the secondary store; and receiving, from the user, a completion indication for the order.

3. The system of claim 1, wherein determining the primary store and the one or more secondary stores further comprises:

receiving, from the user, the pickup type for the order;
determining the primary store based at least in part on the pickup type for the order; and
determining the one or more secondary stores based at least in part on the pickup type for the order.

4. The system of claim 3, wherein determining the primary store further comprises:

when the pickup type is user pickup, determining the primary store based at least in part on a store selection by the user; and when the pickup type is delivery-service pickup, determining the primary store based at least in part on a closest store to an address of the user.

5. The system of claim 4, wherein determining the one or more secondary stores further comprises:

when the pickup type is user pickup, determining the one or more secondary stores based at least in part on one or more closest stores to the primary store; and when the pickup type is delivery-service pickup, determining the one or more secondary stores based at least in part on the address of the user falling within respective delivery regions of the one or more secondary stores.

6. The system of claim 5, wherein the one or more closest stores to the primary store are cached each day.

7. The system of claim 3, wherein determining the one or more secondary stores further comprises:

determining the one or more secondary stores based at least in part on a store type of the primary store.

8. The system of claim 1, wherein, when the pickup type is user pickup, the user interface further comprises (1) a description of the primary store, (2) a notification that the list of available time slots includes time slots from nearby stores, and (3) a description of each of the one or more secondary stores associated with the at least the portion of the second time slots.

9. The system of claim 1, wherein generating the list of available time slots further comprises replacing unavailable time slots at the primary store during a predetermined time period with the at least the portion of the second time slots at the one or more secondary stores.

10. The system of claim 9, wherein the predetermined time period is no more than two days.

11. A method being implemented via execution of computing instructions configured to run at one or more processors, the method comprising:

determining a primary store and one or more secondary stores for pickup of an order of a user, based at least in part on a pickup type of the order, further comprising:

performing a first lookup call to a first cache of one or more proximate access points based on the primary store;

when a list of the one or more proximate access points is retrieved in the first lookup call, returning the list of the one or more proximate access points to determine the one or more secondary stores; and when the list of the one or more proximate access points is not retrieved in the first lookup call;

performing a second lookup call to a second cache of active access points, locations of the active access points, start times of the active access points, and end times of the active access points;

determining the one or more proximate access points from among the active access points based on (i) absolute distances between a location of the primary store and the locations of the active access points, and (ii) the start times of the active access points and the end times of the active access points satisfying time window criteria, wherein cache entries in the second cache are invalidated periodically to freshen the second cache; and storing the one or more proximate access points in the first cache to update the first cache;

determining real-time availabilities of first time slots at the primary store and real-time availabilities of second time slots at the one or more secondary stores;

generating a list of available time slots comprising at least a portion of the first time slots at the primary store and at least a portion of the second time slots at the one or more secondary stores, based at least in part on the real-time availabilities of the first time slots at the primary store and the real-time availabilities of the second time slots at the one or more secondary stores; and facilitating displaying to the user a user interface comprising at least a portion of the list of available time slots.

12. The method of claim 11, further comprising:
receiving a selection of a time slot from the user, wherein the time slot is one of the second time slots at the one or more secondary stores;

determining whether all items in the order are available at a secondary store of the one or more secondary stores associated with the time slot;

facilitating displaying to the user one or more items that are not available at the secondary store; and receiving, from the user, a completion indication for the order.

13. The method of claim 11, wherein determining the primary store and the one or more secondary stores further comprises:

receiving, from the user, the pickup type for the order;
determining the primary store based at least in part on the pickup type for the order; and determining the one or more secondary stores based at least in part on the pickup type for the order.

14. The method of claim 13, wherein determining the primary store further comprises:
   when the pickup type is user pickup, determining the primary store based at least in part on a store selection by the user; and
   when the pickup type is delivery-service pickup, determining the primary store based at least in part on a closest store to an address of the user.

15. The method of claim 14, wherein determining the one or more secondary stores further comprises:
   when the pickup type is user pickup, determining the one or more secondary stores based at least in part on one or more closest stores to the primary store; and
   when the pickup type is delivery-service pickup, determining the one or more secondary stores based at least in part on the address of the user falling within respective delivery regions of the one or more secondary stores.

16. The method of claim 15, wherein the one or more closest stores to the primary store are cached each day.

17. The method of claim 13, wherein determining the one or more secondary stores further comprises:
   determining the one or more secondary stores based at least in part on a store type of the primary store.

18. The method of claim 11, wherein, when the pickup type is user pickup, the user interface further comprises (1) a description of the primary store, (2) a notification that the list of available time slots includes time slots from nearby stores, and (3) a description of each of the one or more secondary stores associated with the at least the portion of the second time slots.

19. The method of claim 11, wherein generating the list of available time slots further comprises replacing unavailable time slots at the primary store during a predetermined time period with the at least the portion of the second time slots at the one or more secondary stores.

20. The method of claim 19, wherein the predetermined time period is no more than two days.

* * * * *